M. RUCKES.
ELEVATING TRUCK.
APPLICATION FILED MAR. 21, 1916.

1,244,783.

Patented Oct. 30, 1917.

WITNESS:
F. V. Paige.

INVENTOR.
Michael Ruckes,
BY
ATTORNEY.

UNITED STATES PATENT OFFICE.

MICHAEL RUCKES, OF CHICOPEE, MASSACHUSETTS, ASSIGNOR, BY MESNE ASSIGNMENTS, TO EUGENE M. CHAPMAN AND CHARLES E. COWAN, BOTH OF HOLYOKE, MASSACHUSETTS.

ELEVATING-TRUCK.

1,244,783.   Specification of Letters Patent.   Patented Oct. 30, 1917.

Application filed March 21, 1916.   Serial No. 85,706.

*To all whom it may concern:*

Be it known that I, MICHAEL RUCKES, a citizen of the United States of America, and resident of Chicopee, in the county of Hampden and State of Massachusetts, have invented certain new and useful Improvements in Elevating-Trucks, of which the following is a full, clear, and exact description.

This invention relates to improvements in that class of trucks which have become commonly known as elevating trucks,—a truck of such description being exemplified in Letters Patent of the United States granted to me August 29, 1916, No. 1,196,723.

The object of this invention is to so construct and arrange the parts of the truck as to adapt it for taking aboard, between the spaced and open opposite side members thereof heavy pieces or bodies of a cylindrical or cross sectionally circular form, such body after being engaged and elevated clear from the floor or ground, being readily transported to the place desired, then lowered onto the floor or ground, and then disengaged or freed from the engaging and lifting means of the truck.

The invention is described in conjunction with the accompanying drawings and is set forth in the claims.

In the drawings:—

Figure 1:
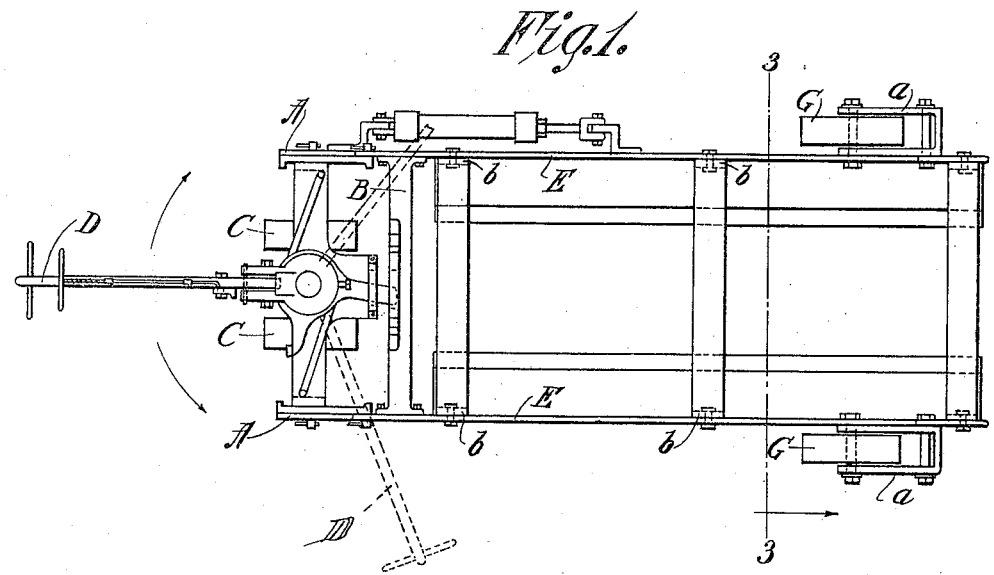
Figure 1 is a plan view of the improved truck.
Figure 2:
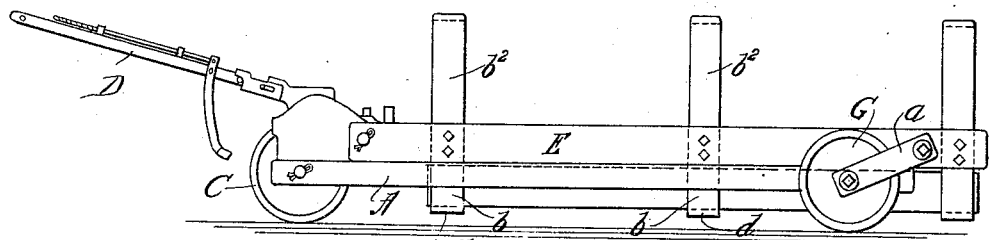
Fig. 2 is a side elevation of the truck showing the elevatable side bars thereof and other appurtenances as in their lowered position.

In the drawings, A A represent opposite lower side bars comprised in the frame of the truck, the same being united by the forward tie beam B, and said truck frame has at its forward end and between the side bars thereof, steering rollers C C and rocking or swiveling means operated through power applied to the draft handle D for causing the elevation and lowering of the opposite upper side members E E,—the means for effecting the raising of the side bars, for locking such side bars in raised position, and for the releasing and lowering of the side bars being fully described and shown in my aforementioned patent and constituting no part of this invention.

In the present truck, the hangers *a* for the rear rollers G G are rigidly secured at the outer sides and at the rear portions of the lower side members A A of the truck frame; and the truck frame from the forward or head portion thereof through to the rear end is clear and open not only as to the space below and at the level of the side members of the truck but also for a considerable distance thereabove.

The elevatable side bars E E have rigid members *b b* connected thereto and which project downwardly inside of, free from, and below the lower side bars and have lower end extremities *d* which are horizontally inwardly turned toward, but terminate outside of, the middle longitudinal line of the truck.

Figure 3:
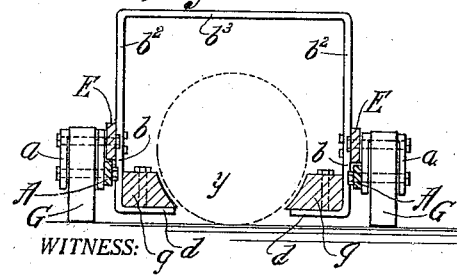
Figs. 3 and 4 are similar cross sectional views as taken on the line 3—3, Fig. 1, one showing the elevatable parts as in lowered position, and the other showing such parts raised for the transportation of the circular body.
Figure 4:
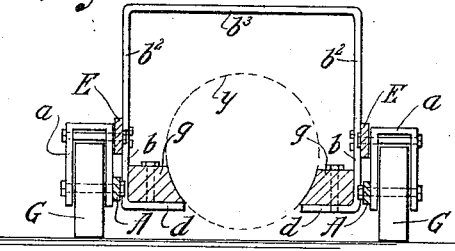

The said horizontally inturned members, or foot pieces, *d d*, have secured thereon longitudinally ranging bars *g g*, the inner edges of which are downwardly and inwardly inclined, being preferably of arc contour, as shown in Figs. 3 and 4.

Some or all of the depending or hanger members *b b* have upward extensions *b²* which are united by an integrally formed intermediate transverse member *b³* to constitute an arch shaped elevated tie for the movable side bars by which the load is sustained and carried, preventing spreading or lateral distortion of the elevatable portion of the truck and preventing the hanger portions *b* from binding against the inner faces of the side members A A of the truck frame proper.

As advantageously and economically constructed, the hanger members and transverse tie members are made of heavy strap iron or steel of inverted U-form and with the extremities of the depending portions right angularly and inwardly turned.

For the moving of a heavy cylindrical body resting on the floor or ground (one being understood as indicated by the dotted circles *y* in Figs. 3 and 4), the truck brought forward and centrally of the object is then backed so that the foot pieces *d d* and the inclined face bars *g g* are at opposite sides of the body and in the spaces between the floor and the upwardly bulging sides (see Fig.

3), whereupon by the elevation of the side bars E E in the manner commonly practised in this class of trucks, the cylindrical object is taken aboard and bodily elevated free and clear of the floor to be transported to its destination (see Fig. 4). Then for the discharge or unloading of the object the elevatable parts are lowered for a resumption of the relations indicated in Fig. 3, whereupon the truck may, without impediment, be drawn forwardly clear and away from the transported piece.

The opposite longitudinal bars, the inner surfaces of which are downwardly and inwardly inclined are advantageous provisions by reason of their constituting a cradle for holding the cylindrical shaped body to be moved in such a manner that the latter is incapable of lateral shifting or displacement.

I claim:

1. An elevating truck comprising side frame members and side bars ranging with, and movable upwardly away from, and downwardly into proximity to, said members, and provided with opposite pairs of depending members which have projections extending inwardly toward but terminating outside of the longitudinal median line of the truck, and said pairs of depending members having arched tie members.

2. An elevating truck comprising side frame members, and side bars ranging with, and movable upwardly away from, and downwardly into proximity to, said members and provided with depending members which have foot-pieces extending inwardly toward, but terminating oppositely outside of, the longitudinal median line of the truck, and longitudinally ranging bars respectively supported by opposite side sets of the foot-pieces, the inner surfaces of which are downwardly and inwardly inclined.

3. An elevating truck comprising lower side bars and upper side bars ranging with, and movable upwardly away from, and downwardly into proximity to, the lower bars, and said upper side bars having members connected thereto which project downwardly inside of and below the said lower side bars, and having lower end extremities which are inwardly turned toward, but terminate outside of the longitudinal median line of the truck, and arch shaped tie members, arranged transversely between and connected to the upper side bars.

4. An elevating truck comprising lower side frame members and side bars above and ranging with said frame side members and elevatable and depressible relatively thereto, and rigid inverted U-shaped members having opposite side portions thereof connected to the inner faces of the upper side members of, said upper side bars and extending downwardly across and free relatively to the side frame members to proximity to the ground level when the said frame bars are depressed and provided with inwardly extended projections having secured thereon longitudinally ranging bars edgewise terminating outside of a median longitudinal line of the truck and having the inner edges thereof downwardly and inwardly inclined.

Signed by me at Springfield, Mass., in presence of two subscribing witnesses.

MICHAEL RUCKES.

Witnesses:
G. R. DRISCOLL,
WM. S. BELLOWS.

Copies of this patent may be obtained for five cents each, by addressing the "Commissioner of Patents, Washington, D. C."